Patented Apr. 7, 1925.

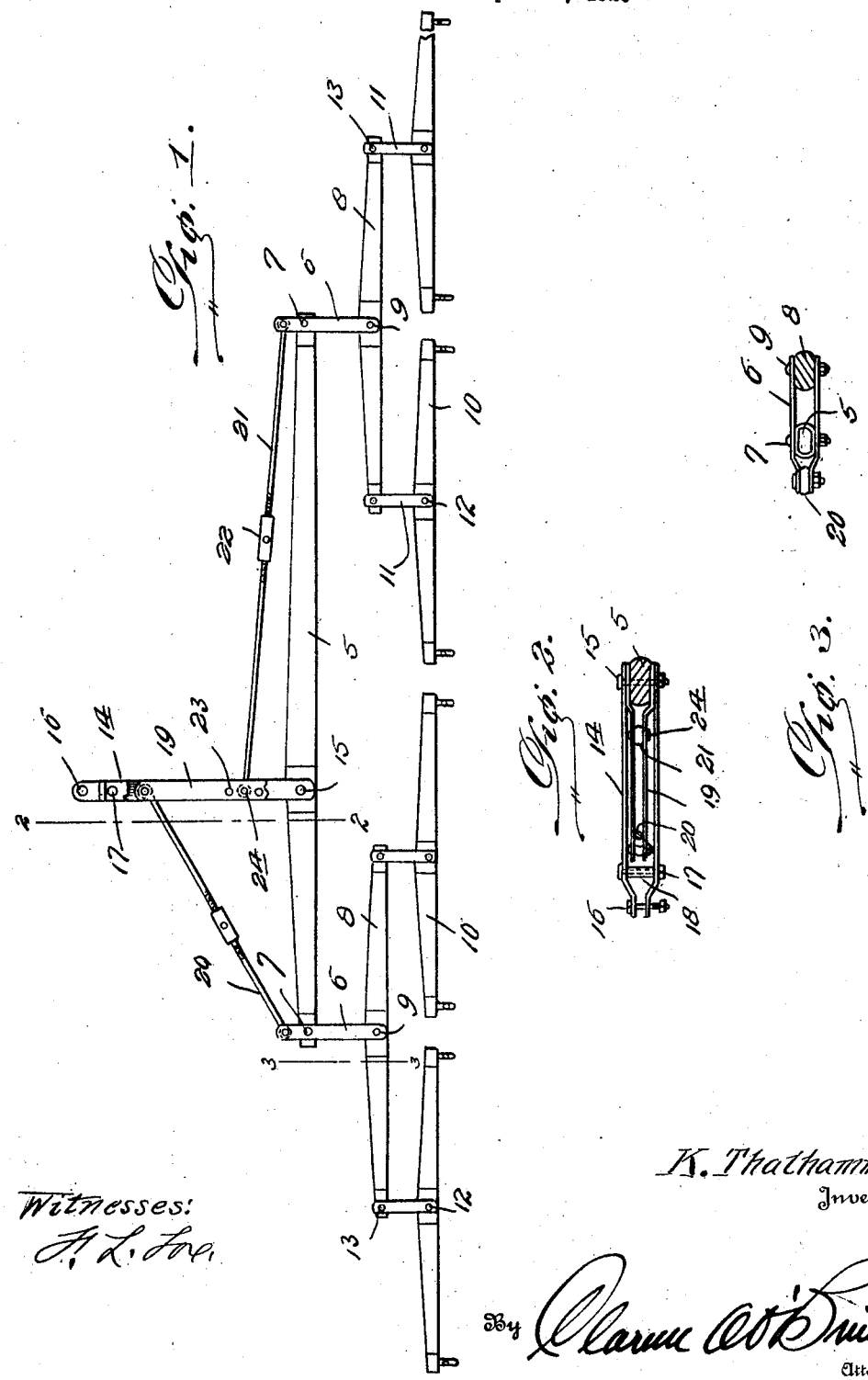

1,532,164

UNITED STATES PATENT OFFICE.

KORBINIAN THALHAMMER, OF COON RAPIDS, IOWA.

DRAFT EQUALIZER.

Application filed September 22, 1923. Serial No. 664,170.

*To all whom it may concern:*

Be it known that I, KORBINIAN THALHAMMER, citizen of the United States, residing at Coon Rapids, in the county of Carroll and State of Iowa, have invented certain new and useful Improvements in Draft Equalizers, of which the following is a specification.

This invention relates to animal draft appliances, and has particular reference to an improved draft equalizer of the four horse type wherein the horses are hitched, so as to be abreast or in side by side relation.

The primary object of the invention is to generally simplify and improve devices of the above kind whereby the same may meet with all of the requirements for a successful commercial use.

Another object of the invention is to provide a draft equalizer of the above type which embraces the desired qualities of simplicity, durability and efficiency in operation.

Another object is to provide a draft equalizer of the above kind wherein provision is made for adjusting the relationship between the several elements of the device so that the latter will operate with extreme efficiency under all conditions met in use.

Other objects will appear as the nature of the invention is better understood, and the same consists in the novel form, combination and arrangement of parts, hereinafter more fully described, shown in the accompanying drawing and claimed.

In the drawing, wherein like reference characters indicate corresponding parts throughout the several views:

Figure 1 is a top plan view, partly broken away, of a draft equalizer constructed in accordance with the present invention.

Figure 2 is a longitudinal sectional view, taken substantially upon the line 2—2 of Figure 1, and Figure 3 is a view similar to Figure 2, taken substantially upon the line 3—3 of Figure 1.

Referring more in detail to the drawing, the invention embodies a transverse beam or cross bar 5 having levers 6 pivoted to the ends thereof for horizontal swinging movement, as at 7, the longer forwardly projecting ends of said lever 6 having double trees 8 pivoted thereto for horizontal swinging movement as at 9, and single trees 10 being in turn connected with the ends of the double trees 8 by means of links 11 that have their forward ends pivoted as at 12 intermediate the single trees 10 and their rear ends pivoted as at 13 to the ends of the double trees 8. The levers 6 are composed of superposed straps as clearly shown in Figure 3 positioned against the upper and lower surfaces of the cross bar 5 and double trees 8, while the links 11 are also preferably similarly constructed whereby the single trees are flexibly connected to the double trees in a well known manner.

A draw bar 14 has its forward end pivoted to the cross bar 5 nearer one end of the latter than the other, as at 15, and this draw bar extends longitudinally and rearwardly from the cross bar 5 where it is provided at its rear end with means, as at 16, for connection with the beam or draw bar of the implement to be drawn. The draw bar 14 preferably embodies superimposed straps having their forward ends respectively disposed above and below the upper and lower surfaces of the cross bar 5 and having their rear ends rigidly connected in spaced relation by means of a bolt 17 passing therethrough and having a spacing sleeve 18 mounted thereon between the straps. Disposed between the straps of the draw bar 14 is a lever 19 that is pivotally connected to the cross bar 5 by means of the pivot connection 15 which consists of a bolt passing through the draw bar 14 and lever 19, as well as through the cross bar 5 as shown in Figure 2. The lever 19 preferably consists of superimposed straps arranged in spaced parallel relation and having their forward ends disposed against the upper and lower surfaces of the cross bar 5, with the forward ends of the straps forming the draw bar 14 disposed thereon. In this manner, the single pivotal connection 15 serves to allow swinging movement of the draw bar 14 in a horizontal plane, and at the same time permits a similar movement of the lever 19 independent of the draw bar 14.

The levers 6 have shorter ends projecting rearwardly from the pivot 7 and the cross bar 5 and these shorter ends of the levers 6 are respectively pivotally connected to the outer ends of obliquely disposed links 20 and 21 that are disposed rearwardly of the cross bar 5 and have their rearmost inner ends respectively connected to the lever 19 at the rear end of the latter and at a point adjacent to but rearwardly of the pivotal connection 15 of said lever 19 with the cross bar 5. Thus, the link 20 is shorter than the link 21 and disposed at a more acute angle to the longitudinal axis of the draw bar 14 than the link 21, and it is noted that the pivotal connection of the ends of the links 20 and 21 with the lever 19 and lever 6 are preferably provided by forming eyes at the ends of said links and passing vertical pivot pins therethrough as well as through the levers 6 and 19 as shown. The links 20 and 21 preferably consist of adjustable tie rods composed of pairs of sections having oppositely threaded adjacent ends connected by a rotatable turn buckle nut, the rotation of which will effect a change in the length of said links 20 and 21. In this manner, the relation of the levers 6 and 19 relative to each other and to the longitudinal axis of the draw bar may be varied, as is found necessary when draft animals of differing size and strength are hitched to the single trees 10. A further adjustment for this purpose is had by providing means, as at 23 for varying the point of pivotal connection between the inner ends of the link 21 and the lever 19, so that said point of connection may be varied to a greater or less extent to or from the point of pivotal connection of the lever 19 with the cross bar 5. This means of adjustment may consist in a longitudinal series of openings provided in the lever 19 adapted for selective reception of the pivot pin 24 by means of which the inner end of the link 21 is attached to the lever 19.

Obviously, the means indicated at 16 for connecting the draw bar 14 with implements to be drawn may be varied greatly, if found necessary to accommodate the device, to draw bars of different types of implements even though the form shown consists of providing vertically aligned openings in the rear ends of the straps forming said draw bar and receiving a vertical bolt adapted to be passed through a horizontal connector or draw bar on the implement.

In operation, the rear end of the draw bar 14 is coupled to the forward end of the implement beam or the like, and four horses are arranged abreast with each of the same hitched to one of the single trees 10. Upon forward movement of the draft animals, the draft is automatically equalized at opposite sides by reason of the operation of the swinging levers 6 and 19 and the link connections therebetween as at 20 and 21, swinging movement of the cross bar 5 being also utilized through the links 20 and 21 for varying the relation of the levers 6.

From the above description, it is believed that the construction and operation as well as the advantages of the invention will be readily understood and appreciated by those skilled in the art.

Minor changes may be made without departing from the spirit and scope of the invention as claimed.

What I claim as new is:—

A draft equalizer comprising a relatively long cross bar disposed transversely of the line of draft, levers pivotally mounted at the ends of the cross bar and normally disposed parallel with the line of draft, inner and outer levers pivoted at their forward ends to the intermediate portion of the cross bar and disposed rearwardly thereof and extending in the line of draft, the last mentioned levers being pivoted at a point nearer one end of the cross bar than the other, a link rod pivotally connected with the rear end portion of the inner lever and pivotally connected at its other end with the lever at the shorter end of the cross bar, a link rod pivotally connected with the inner lever at a point between the cross bar and the point of pivotal connection of the first mentioned link rod with the inner lever, and pivotally connected with the lever at the longer end of the cross bar, the rear end portion of the outer lever extending beyond the rear end of the inner lever, and adapted to be connected with a draft appliance.

In testimony whereof I affix my signature.

KORBINIAN THALHAMMER.